United States Patent [19]
Alberts

[11] Patent Number: 5,937,392
[45] Date of Patent: Aug. 10, 1999

[54] BANNER ADVERTISING DISPLAY SYSTEM AND METHOD WITH FREQUENCY OF ADVERTISEMENT CONTROL

[75] Inventor: Charles D. Alberts, Bolton, Mass.

[73] Assignee: Switchboard Incorporated, Westboro, Mass.

[21] Appl. No.: 08/901,393

[22] Filed: Jul. 28, 1997

[51] Int. Cl.$^6$ .............................. G06F 17/00; G06F 17/60
[52] U.S. Cl. ................................................. 705/14; 705/26
[58] Field of Search ........................................ 705/14, 26

[56] References Cited

U.S. PATENT DOCUMENTS

| | | | |
|---|---|---|---|
| 5,305,195 | 4/1994 | Murphy | 705/1 |
| 5,572,643 | 11/1996 | Judson | 395/200.48 |
| 5,721,827 | 2/1998 | Logan et al. | 395/200.47 |
| 5,724,521 | 3/1998 | Dedrick | 705/26 |

OTHER PUBLICATIONS

Doubleclick, "Doubleclick Debuts New Tool for Testing Creative on the Web", PR Newswire, May 20 1996, 2 pages, Apr. 1996.

Network World Fusion, "Network World Fusion Partners with Focalink Communications to Offer Unprecedented Value–Added Online Advertsiing Options", PR Newswire, Jun. 3, 1996, 3 pages.

C/Net, "C/Net: The Computer Network Unveils Revolutionary Internet Advertsiing Tools that Allow Cusom Banner Ad Delivery Based on Demographic Information", PR Newswire, Dec. 6, 1995, 3 pages.

*Primary Examiner*—Allen R. MacDonald
*Assistant Examiner*—James W. Myhre
*Attorney, Agent, or Firm*—Hale and Dorr LLP

[57] ABSTRACT

An Internet advertising system has a database, a controller, and an ad server operating as part of a web server. The database has advertising campaign information, including identification information and frequency information for how often the ad is to be served. The ad server uses the campaign information from the database to control the relative ratios of serving ads, the distribution of ads throughout the day, and any triggering mechanisms for controlling what ads are served.

19 Claims, 5 Drawing Sheets

| | AD IDENTIFIER | START DATE | RUN LENGTH | FREQUENCY (HITS/DAY) | TRIGGER EVENT |
|---|---|---|---|---|---|
| AD 1 | | | | | |
| AD 2 | | | | | |
| AD 3 | | | | | |
| AD 4 | | | | | |
| AD 5 | | | | | |

FIG. 3

| ADS | M | D | A | | |
|---|---|---|---|---|---|
| | | | | | |
| | | | | | |
| | | | | | |
| | | | | | |
| | | | | | |

| | MO | 1 | 2 | 3 | 4 | 5 | 6 | 7 | 8 |
|---|---|---|---|---|---|---|---|---|---|
| AD #1 | 1 | 0→1 | 1 | 0→1 | | 0→1 | | 0→1 | |
| AD #2 | 2 | | | | 0→2 | | 1 | | 0→2 |
| AD SERVED | | #1 | | #1 | #2 | #1 | | #1 | #2 |

→ STEPS

FIG. 6b

| | MO | DO | AO | 1 | 2 | 3 | 4 | 5 | 6 | 7 | 8 | 9 | 10 |
|---|---|---|---|---|---|---|---|---|---|---|---|---|---|
| AD #1 | 1 | 0 | 0 | 0→1 | 1 | 0→1 | | 0→1 | | 0→1 | | 0→1 | |
| AD #2 | 2 | 1 | 1 | | | | 0→3 | | 2 | | 1 | | 0→2 |
| AD SERVED | | | | #1 | | #1 | #2 | #1 | | #1 | | #1 | #2 |

↑ STEPS $D = 0(\rightarrow 1)$
$M = MO + AO = 3$

BANNER ADVERTISING DISPLAY SYSTEM AND METHOD WITH FREQUENCY OF ADVERTISEMENT CONTROL

BACKGROUND OF THE INVENTION

This invention relates to providing advertisements (ads) over a large network, and particularly for advertising over the Internet.

Along with other information, Internet information providers can provide ads to users in a number of forms, one of which is as a "banner" across an Internet page, often at the top of the page. A banner ad can have text and still or moving graphics, and typically serves as an HTML (HyperText Markup Language) link, such that the user is linked to another specified page if the user clicks on the banner. Some Internet sites are always associated with the same particular one or more banner ads; each time the site is accessed, the particular ad or ads are displayed along with the other information that is displayed (an access to a site or page is referred to as a "hit").

Rather than associate one or more particular banner ads with a page for every hit, banner ads can be sold in terms of frequency—a number of hits per day, particularly from sites that have a large number of hits per day. A system with a small number of different ads that are served (and thus displayed) an equal number of times can easily be envisioned. In this case, a list of ads is made and a pointer moves in a circular fashion to identify a next ad each time an ad is served. If the site has 10,000 hits in a day, four ads would each be served 2500 times per day.

Such a system would be difficult to manage and operate if the numbers of serves per day for the different ads were different, and particularly if they were different significantly and by non-integral ratios. Different advertisers may want substantially different numbers of hits; e.g., one advertiser may want 100,000 hits per day for 10 days, another advertiser may want 10,000 hits per day for only one day, and yet another may want 45,000 hits per day for a month. Another complication that occurs is that the number of hits can be approximated for a single day, but the number of hits can vary; if the number of hits increases on a particular day, an advertiser may want the ads distributed throughout the day so that not all ads are served early in the day. Alternatively, an advertiser may want a concentration or intensification of ads at particular times, perhaps in response to a profile of users, e.g., different times for children versus adults, or for people accessing the site from home versus work.

It would be desirable for a web site administrator that sells ads based on a number of hits per day to have an efficient way to cause the appropriate number of ads to be served and to be able to adapt to different situations in a flexible manner.

SUMMARY OF THE INVENTION

The present invention is an advertising system for use with a large, publicly accessible network, such as the Internet. The system has at least one server for providing information in response to a request from a user. The system includes an advertising server, an advertising database, and an advertising controller for communicating with the ad server and the ad database. The database stores information about the ads, and the controller loads advertising campaign data, preferably in the form of tables, from the database to the ad server. The ad server uses the information to cause the ads to be served as desired.

To obtain efficient distribution of the ads relative to each other and throughout the day (referred to here as "rotation control"), each ad is preferably associated with at least two counters that are operated such that the system can quickly determine which ad is to be served, without intensive computational overhead. Rotation control can be performed as desired, even with a large number of ads and with a wide range of variation and non-integral ratios between the number of times the ads are to be served. The ad server effectively makes a single list of ads and has a pointer that moves through the list until it reaches an ad to be served. To reduce steps for each serve, the system is designed so that the pointer need not move through more than one cycle of ads on the list without determining an ad to be served. Unused hits can be dedicated to other entities on an unpaid basis, such as to charities, but treated like other ads.

The system can predictively model the number of hits to control the distribution of serves, either to ensure even distribution, or to concentrate ads during particular times. The system also preferably has triggering information that allows ads to be targeted. Ads can be targeted to users seeking certain types of information, e.g., on a yellow pages system or on a search engine, access to "photography" could cause the serving of an ad for a manufacturer of film; to users from particular geographic locations; to particular users; or to users at different times of the day.

The system of the present invention also provide statistical, reporting, and feedback functions to allow a system manager to monitor and report the serves. This data can be used for control purposes, and also to provide reports to verify the ads that have been served.

The present invention provides an integrated system that allows ads to be served in a highly flexible and accurate manner a desired number of times throughout the day and evenly distributed throughout the day, or intensified at times if desired. Different ads can be served based on different triggering events, such as the location of the user, the type of information being accessed by the user, or the categories accessed. Other features and advantages that have become apparent from the following detailed description, drawings and claims.

DETAILED DESCRIPTION

Figure 1:
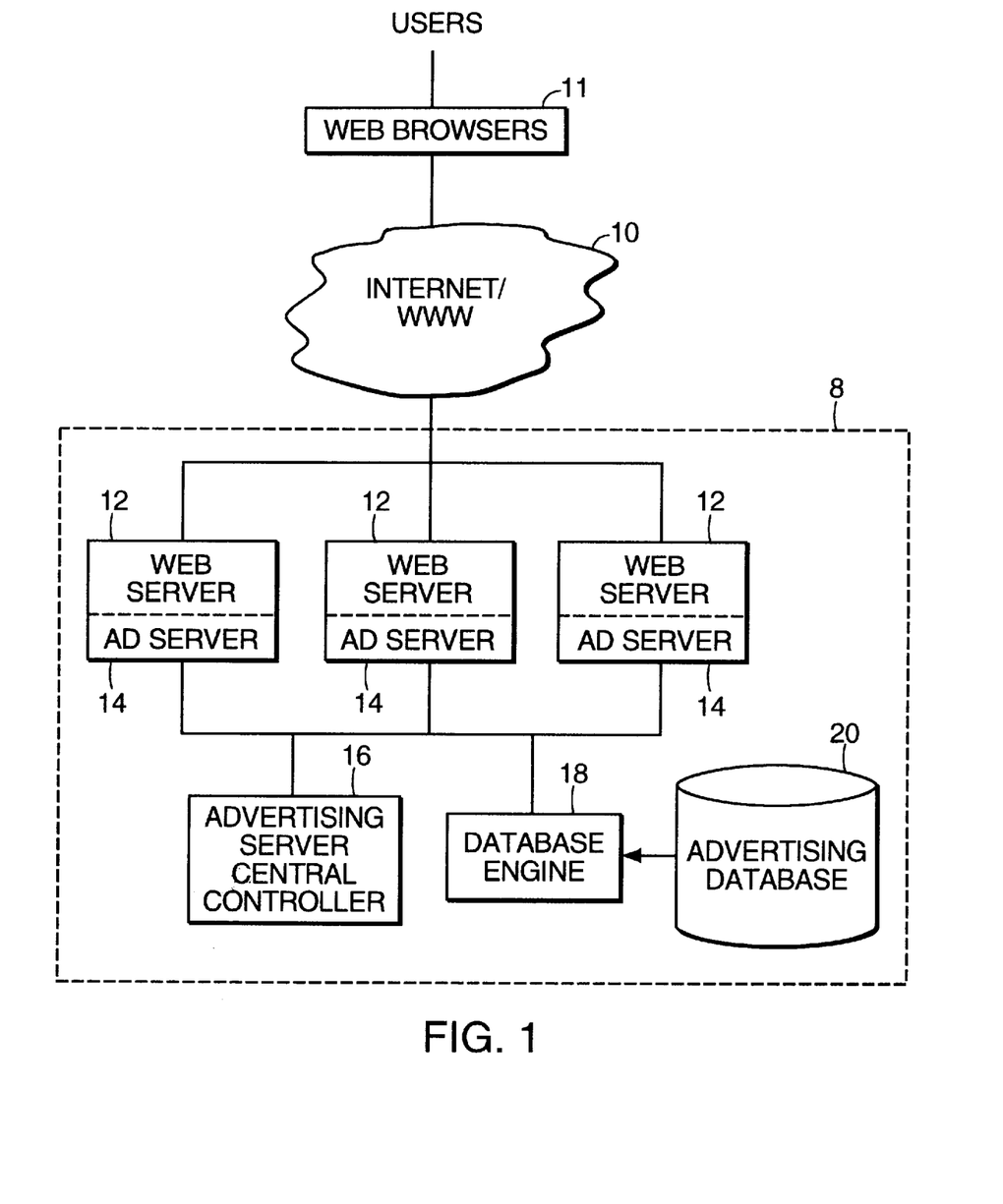
FIG. 1 is a block diagram of an advertising system according to the present invention.

Internet 10 is a large interconnected network of computers, a subset of which is the World Wide Web. Users can access servers to obtain information over the web with a conventional web browser 11. In a system according to the present invention, an accessible web site 8 has a number of web servers 12 in communication with the Internet for responding to users by providing files or information from databases. Each web server 12 has an advertising (ad) server 14 that has known, conventional data insertion tools for causing one or more ads, such as banner ads that also serve as HTML links, to be displayed when a page of information, such as a file or database information, is returned to a user who accesses web site 8.

An example of an informational service with which the system of the present invention can be used is the SWITCHBOARD® directory service, currently at the Internet address www.switchboard.com (SWITCHBOARD is a registered trademark of Switchboard, Inc.). This directory service has a large white pages directory of people and businesses. To use this directory service to find people, a user accesses the site with a web browser to obtain an input screen with fields for a user to enter a name and, optionally, a city and/or state. The directory service accesses one or more databases and returns a list of records that match the queries. The service can also be used to find businesses by name, or to search businesses by a category of goods or services. The present invention can be used with such an informational service, particularly with informational services that respond to requests, such as a stock quote service or a mapping service, or with any other page that can be accessed, such as a page of information.

Figure 2:
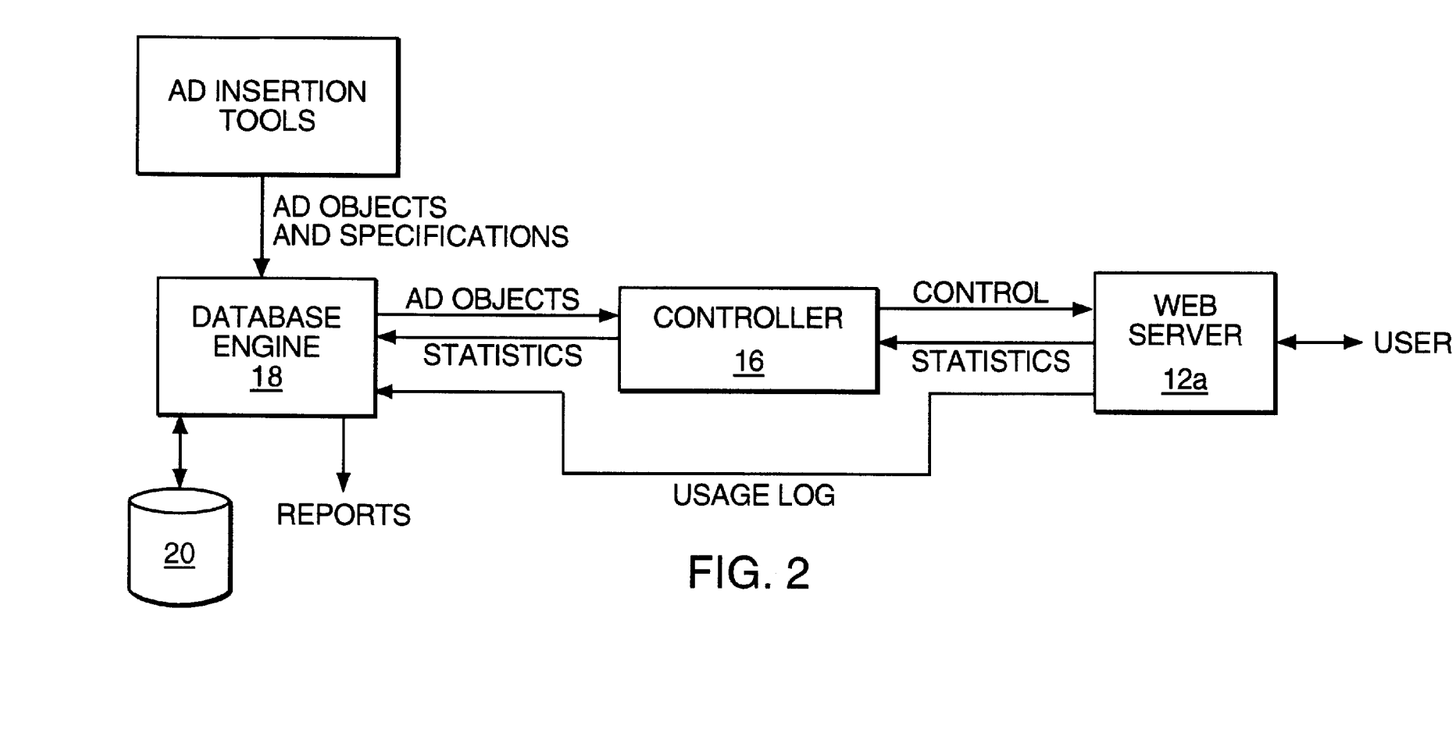
FIG. 2 is a block diagram illustrating the flow of information in the system of FIG. 1.
Figure 3:
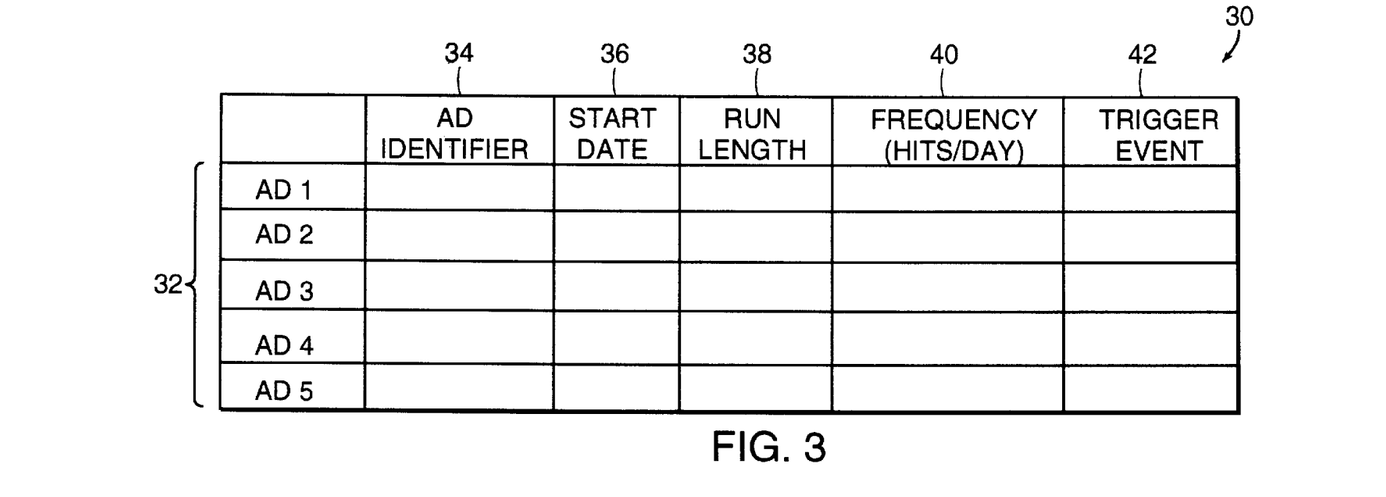
FIGS. 3 and 4 illustrates tables maintained in the system of the present invention.

Referring also to FIG. 2, ad servers 14 can be implemented with common gateway interface (CGI) scripts, or they can be implemented as software that runs as part of the web server process. When a user contacts one of web servers 12 with a query or a request for information, ad server 14 causes one or more ads to be served along with a response to that request Each ad server 14 communicates with an ad controller 16 and with a database engine 18. Database engine 18, in turn, communicates with an advertising database 20. Referring also to FIG. 3, advertiser database 20 (which can be configured as and considered to be one database or multiple databases) has tables 30 that maintain information indicating parameters for the display of ads. These tables thus hold what is referred here to as advertising campaign data.

The campaign data can be arranged in many forms. The implementation shown here in FIG. 3 for illustrative purposes is a single table 30 that has rows of ads 32 and columns of information associated with each of the ads. The first column is an ad identifier 34 that effectively identifies the data that is to be provided to the user. The ad identifier can include a uniform resource locator (URL) or a pointer to a graphical and/or textual object. Table 30 also has stop/start information for when the ad is to run; it can be arranged as a stop and start date, or (as shown) as a start date 36 and run length 38. A frequency column 40 indicates a number of times an object is to be seen during a specified time period, preferably one day. Table 30 can also include triggering information 42 to indicate under what circumstances the ad is to be displayed. This triggering information is discussed in more detail below. These pieces of information can easily be added to the database in response to a data entry screen with a small number of fields. Because this data relates to the whole campaign, it can be entered once and be valid for a long period; consequently, this campaign data may not require very little updating or maintenance.

Referring particularly to FIG. 2, controller 16 is preferably implemented with programmed processing hardware, and with software that can be maintained in any desired medium, such as memory chips or disks. Controller 16 accesses tables 30 in advertiser database 20 and provides the information from these tables to ad servers 14; the campaign data in tables 30 is converted into a portable "meta" format that is used by the ad server to build internal tables within storage in the ad server (or storage easily accessible to the ad server). The tables built by the ad server contain information derived from the "meta" information, such as the content of ad objects, ratios of serves, counters for rotation (discussed below), and the numbers of serves per ad for use in maintaining statistics and logging. The campaign data is thus held as a central store from which it can be distributed to the individual ad servers.

Controller 16 receives from ad server 14 statistics that indicate what ads have actually been served and how often these ads have been served; these statistics are used by the controller to provide active feedback to the ad server to ensure accurate control of the serving of ads. Controller 16 formats the statistics from ad servers 14 and provides these statistics to database engine 18 for storage in database 20.

Ad servers 14 also provide a usage log directly to database engine 18 and then to database 20 for storage. The usage log and the statistics from controller 16 are used by database engine 18 to generate external reports for a system manager. These reports can be generated in one of many different ways, including hour-by-hour updates and/or daily reports on what ads were served so that the system manager can determine if the ads are being served at the proper ratios and with the proper distribution throughout the day. Corrections can thus be made if an inconsistency is seen between the expected and actual numbers of serves. Moreover, these reports can be used to provide to advertisers verification that their ads were actually displayed in the frequency and at the times expected, as well as the number of times the viewer clicked on the ad and the "click yield," i.e., the number of clicks per number of servers as a percentage.

The controller can also prepare on-line reports for each individual ad server, and for the entire web site. The logs are used to provide reports with known log analysis tools, while the statistics are used to provide feedback to the controller for the whole site. The controller can then request statistics from each of the ad servers directly and individually.

According to the present invention, ad servers 14 provide rotational control that ensures that ads are served a desired number of times per day and with a desired distribution throughout the day, even with a large number of ads, a wide variation in ratios of hits, and/or wide variations of hits per day over multiple days. Each ad server 14 determines which ads are active based on the start and run length information from table 30; for each active ad, ad server 14 looks to the frequency to determine a number of serves per day for each ad. Server 18 then associates each active ad with at least counters that are implemented and configured for rotational control.

Figure 4:
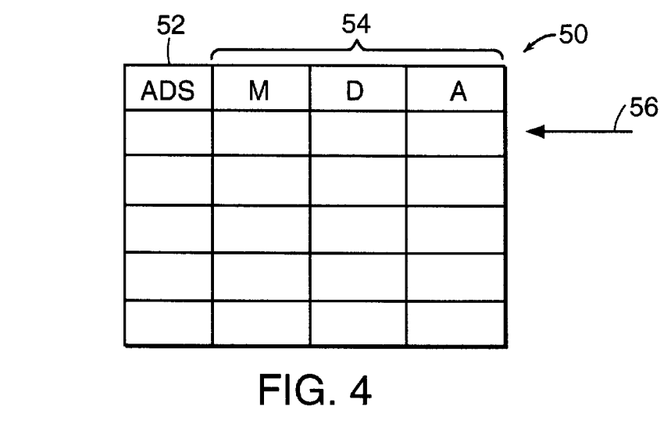

Referring also to FIG. 4, while the data for rotational control can be implemented in different ways, as shown here, ad server 14 builds a counter table 50. Associated with each ad, table 50 has a first column 52 with ads, and counters 54 with two counters.

In operation, a pointer 56 cycles through the rows, until it points to a row in which the counters indicate that the object is to be served. The pointer moves in a circular manner, so the pointer moves from the last ad in the list to the first.

The first counter, referred to as the main counter, has a value M that is decremented each time a cycle of ads is completed. (The term "decremented" is used broadly herein as noted below.) The first counter, which has an initial value of M0, decrements each time the pointer passes the row. When the pointer reaches an ad for which M=0, the ad is served and the main counter then resets to its initial value, M0.

A second counter, referred to here as the delay frequency counter, has a value D which starts from an initial value D0 and is decremented each time the corresponding main counter M (in the same row for the same ad) equals zero and the ad is served. The third column has a constant value that is referred to as the delay constant A0. When D=0, value A0 is added to the value of M0 for the next time that ad is to be displayed; this addition thus causes a delay in the serving of that ad the next time. The value of the third counter can be decremented and thus change, or it can be a constant that is added each time it is needed, but then is not changed.

The values for the three constants, M0, D0, and A0, are determined based on ratios of the frequency of ads. To determine these ratios, the ads are arranged based on the number of times per day that each is to be displayed. Next, values are determined for the other ads by dividing the highest frequency ad by each of the less frequent ads to determine ratio values. Consequently, the most frequent ad (or ads) has a value M0=1. For example, if the most frequently displayed ad has 100,000 hits per day, another ad that is to be served with 50,000 hits per day and another with 5,000 hits per day, these ads will have ratio values of 1, 2, and 20, respectively.

The values of D0 and A0 are determined based on the floating point remainder of the ratio. If the ratio has a remainder of zero as in this example, D0 and A0 are set to zero, because no delay is needed to keep the ratios accurate. Assuming another ad is served with 30,000 hits per day, the ratio is 3.333, in which case the main counter has a value of M0=3, with a floating point remainder of 0.333. The remainder is used to derive D0 and A0. These values can be precalculated and obtained from a lookup table, or they can be calculated as needed.

Figure 6A:
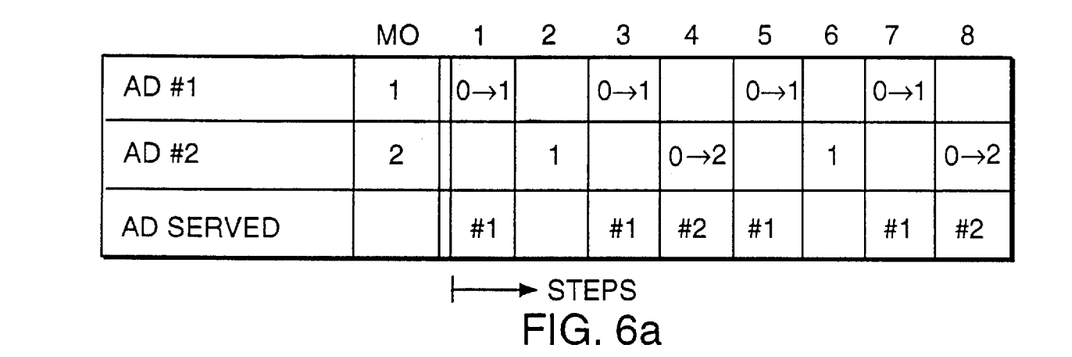
FIGS. 6(a) and 6(b) are charts illustrating rotational control.
Figure 6B:
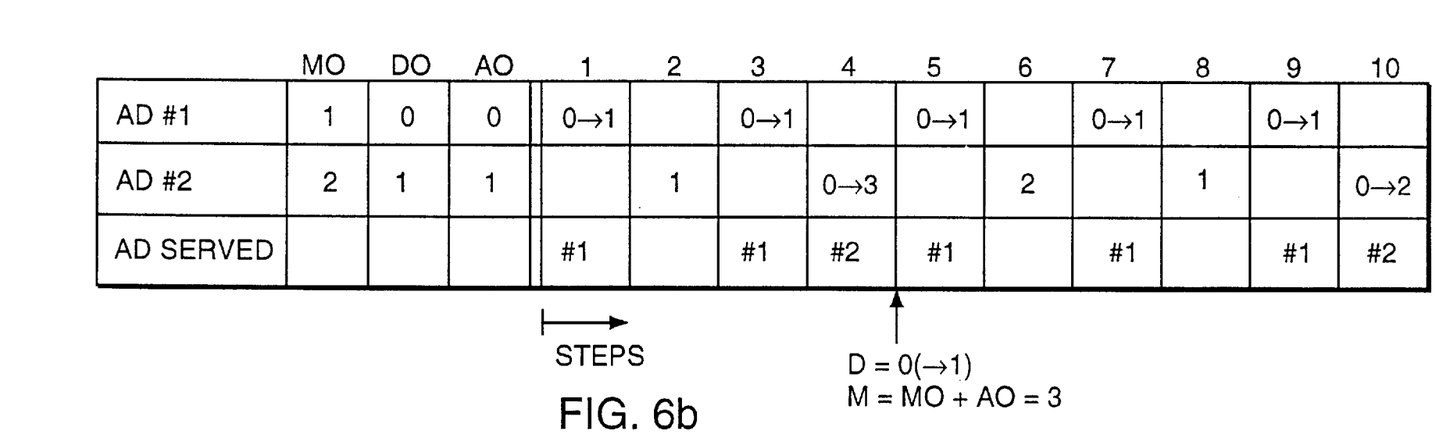

Simplified examples of such rotational control are shown in FIGS. 6(a) and 6(b). As noted above, the main counter sets the ratio of serves to the integer value, rounding down to the more frequent, while the delay counter and amount delay the serves to make the ratio of actual serves accurate. Referring to FIG. 6(a), for example, if there were only two ads, a first with 100,000 serves per day and a second with 50,000 serves per day (actually, any 2:1 ratio could be used), the main counters could be set at 1 and 2, respectively, and there would be no need for delay counters.

FIG. 6(a) shows 8 steps of operation where ad #1 and ad #2 have main counter initial values M0=1 and M0=2, respectively. The steps refer to pointer movements, not to the serves themselves. In step 1, M decrements to zero, and ad #1 is served; the main counter then resets immediately to M0=1. In step 2, the main counter for ad #2 decrements to 1, then in step 3, the main counter for ad #1 decrements to zero and ad #1 is served again. In step 4, the main counter for ad #2 decrements to zero, so ad #2 is served, and its counter is reset to M0=2.

As shown in FIG. 6(a), this pattern repeats itself, and ads #1 and #2 are thus served in a 2:1 ratio.

But if the second ad had 40,000 serves per day, the ratio would be 2.5. In this case, the delay counter is used to delay the serves to make up for the difference of 0.5. In concept, the idea is that the 2:1 pattern of FIG. 6(a) is still used to some extent, but there is a delay feature by which serving of ad #2 is delayed periodically so that the ratio is brought down to 2.5:1 rather than 2:1.

Referring to FIG. 6(b), as shown here, for ad #2, D0, the initial value of the delay counter, is 1; and the delay amount constant, A0, also is 1. The first four steps are the same as for FIG. 6(a), resulting in 2 serves of ad #1, and 1 serve of ad #2. When ad #2 is served, however, delay counter D decrements to 0, causing A0 to be added to M for one series of steps until ad #2 is served again. In this case, the next series of serves will be 4 serves in a 3:1 ratio. As a result, this means a total of 7 serves, with 5 serves of ad #1, and 2 serves of ad #2, for the desired 5:2 ratio. This series of steps 1–10 will now repeat, and thus continue the 5:2 ratio.

It should be apparent that as D0 is increased, the ratio will approach 2:1 (indeed the 2:1 ratio could be seen as an infinite D0, i.e., where a delay is rare to non-existent). To get ratios exceeding 2.5, A0 is made larger in conjunction with D0. For example, if D0=2 and A0=2, the serves will be 2:1, 2:1, and 4:1, for an overall ratio of 8:3, or 2.67. A programmed processor can easily make the calculations for the desired ratios.

Accordingly, by using a delay, whereby the serving of one or more ads is delayed at desired times, ads can be served with desired non-integral ratios, and well distributed through a given time period.

With this system, each ad need only be listed once in a table, such as the table in FIG. 4, and then accessed with a moving pointer (or other method for incrementally identifying items in a group), without requiring repetition or duplication of items to forcibly fix ratios. The pointer need never cycle through the list of ads for more than one cycle because one ad always has a main counter value M0=1. These features reduce the number of moves with the pointer, and therefore reduce the steps and computational overhead. In the simplified example above, only 10 pointer movements are needed for 7 serves, and each ad need only be listed once in the list.

The system can also accommodate the situation in which the number of hits per day is undersold compared to the estimated and/or actual number of hits. For example, if a system is typically receiving 500,000 hits per day and only 250,000 hits per day have been sold, the system can insert banners for charitable organizations, free serves on a trial basis, or public service announcements. In this case, such ads can be rotated in with the other ads.

Figure 5:
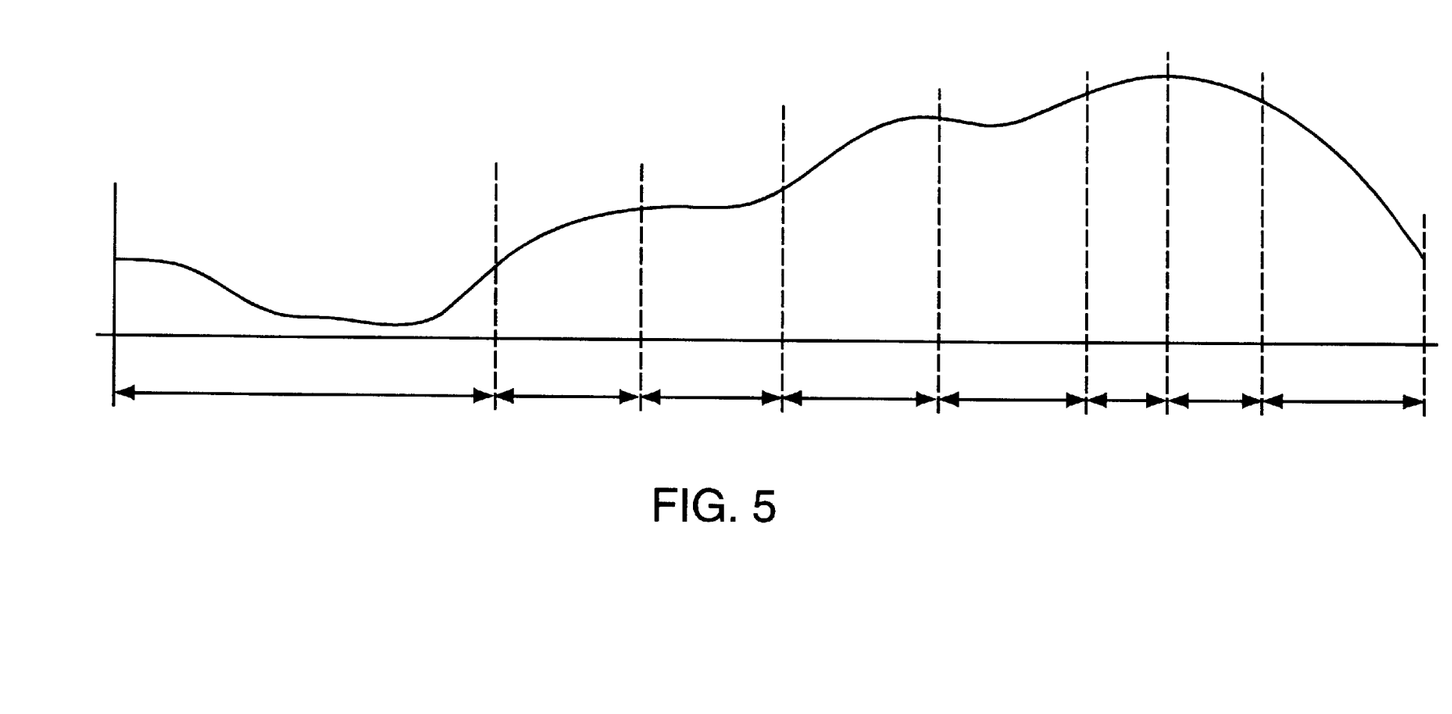
FIG. 5 is a graph illustrating a change in hits throughout a time period.

While the counters are used to provide an appropriate balance in the numbers of serves for each ad relative to the others, other methods can be used to provide appropriate distribution throughout the day. FIG. 5 is a graph representing how usage might vary throughout one day from midnight to midnight (the graph here is merely illustrative and is not meant as a precise measure). Based on recurring patterns, such as when most people work, the time zones, and the day of the week, the number of hits to a particular service may be predicted based on prior experience. The hours of the day can be broken up into time regions that may be less frequent during certain non-peak times and more frequent during peak times, and the frequency with which hits are calculated can be varied from numbers of hits per day to number of hits per time periods, with the time periods being reloaded from the database to the ad server by the controller on a more frequent basis throughout the day. This approach, in effect, alters the granularity with which the hits are monitored. With this approach, the time periods can vary in duration from short duration during peak times to longer duration during non-peak times.

Another way to implement such distribution is to provide control from the controller based on the statistics that are being provided from the ad server. If the controller determines that the number of hits is higher for a given time period, it can cause the system to delay serving all paid ads or all ads of a particular type, and then only serve ads used fill in gaps between the total number of hits and the number of paid hits. This way, there may be some gaps, but the distribution is made more regular through the day.

The controller can build a model of traffic based on past traffic data, and then this model is used with current statistics collected from the ad servers to make new "meta" tables on a regular basis, such as hourly. A simpler method, however, is to collect statistics from ad servers and to adjust the "meta" tables based on recent information. In this case, a dampening algorithm could be applied to prevent feedback oscillation.

The present invention also provides the control and flexibility to allow ads to be served based on different triggering events. One way to implement this feature is by using multiple tables, each of which corresponds to a different triggering event. For example, an access by a user from a particular region could cause ads targeted to some regional-based businesses, such as department stores or grocery stores, to be served. Another type of targeting uses the accessed information to infer that the user has a particular interest, e.g., if a user searches a business directory for a business in a particular category, such as photography or skiing. In this system, some ads may be designed to go to all users, regardless of location or specific interests, while other ads may be targeted based on whatever triggering events are desired.

As an example of multiple tables, one table can be the general or default table where ads are identified. There could additionally be a "Skiing Table" with ads for ski manufacturers, sporting goods stores, and/or ski resorts. If a user accesses information relating to skiing, the system looks to the Skiing Table instead of the general table. Accordingly, the method for serving ads with such multiple tables could include an initial step of first determining whether a triggering event occurred and then branching to the appropriate table in response to the comparison.

In another implementation, a table that has counters, such as that shown in FIG. 4, can also have one or more additional fields with triggering information that can indicate a programmable triggering code. If the system detects the code, such as an indication that a user has tried to access a particular type of information, that ad can effectively override the selection based on the counters. In this case the system can first check whether the user's access has caused an alert to any known code (or at least checks for a triggering event for which there is a code) before checking the counters to determine which ad to serve; alternatively an ad can be triggered to be served only if there is triggering information associated with the ad, and not served otherwise.

It should be apparent that modifications can be made without departing from the scope with the invention as defined by the appended claims. The term decrementing is used broadly and further includes incrementing; while the decrementing is indicated as a change of value by +1 or −1, the decrementing can be for any change in value that effectively serves as a counting mechanism, i.e., in theory one could count by 2's.

What is claimed is:

1. An advertising system comprising:
a web server for providing information to users over the Internet in response to being accessed by the user, the web server including an advertising server for providing advertising information along with other information provided to users over the Internet;
an advertising database for storing information including different ads to be served and a frequency with which each ad is to be served to users; and
an advertising controller for providing to the advertising server information from the database;
the advertising server using the information from the database to associate each ad with a number of counters and using the counters in determining which of the ads to serve, the counters being used to ensure that ads are served the desired number of times over the given time period relative to other ads.

2. The system of claim 1, wherein the counters compensate for the situation when the frequency of a number of different ads have non-integral ratio values.

3. The system of claim 1, wherein advertising server creates a list of ads, with each ad listed only once in the list, the server having a pointer that cycles through the list to points to an ad to be served.

4. The system of claim 3, wherein each ad is associated with a first counter indicative of the portion of a ratio between the frequency of the ad and another ad.

5. The system of claim 1, wherein a second counter associated with an indicates a periodic delay in the serving of that ad, so that the serves of the ads have a desired ratio.

6. An advertising system for advertising with ads over a user-accessed network, the system comprising:
an advertising database with advertising campaign data, including an identification for each of a number of ads and other data associated with each of the ads; and
a server for providing information in response to requests from users, and for serving one or more ads from a larger list of ads along with that information, the server receiving the advertising campaign data and generating a list of ads to be served and having a pointer for identifying a next ad to be served.

7. The system of claim 6, wherein the server provides to the database a usage log of ads that have been served over a time frame.

8. The system of claim 6, further comprising a controller for providing the advertising campaign data to the server, the controller receiving statistics relating to the serving of ads from the server and providing control signals to the server in response to the statistics.

9. The system of claim 6, wherein the list of ads includes triggering information indicating events particular to the individual ads for causing the ads to be served.

10. The system of claim 6, wherein the server builds multiple lists of ads, at least one of which is used only in the case of a triggering event.

11. A method for advertising over the Internet, the method comprising:
maintaining a database of information relating to a number of ads to be served including frequencies with which the ads are to be served;
providing the information from the database to a web server;
the web server deriving from the information a list of the ads and data based on the frequencies with which the ads are to be served; and
in response to a user's request, serving one or more, but less than all, of the ads based on the data, and causing a next ad to be identified.

12. The method of claim 11, wherein the deriving step includes deriving a set of counters with values such that the ads are served with frequencies in desired ratios to each other, wherein the frequencies of the ads can have integral or non-integral values.

13. The method of claim 11, wherein the serving includes determining whether a triggering event has occurred, the triggering event identifying a subset of ads that are available to be served.

14. The method of claim 13, wherein the triggering event includes the information requested by the user.

15. The method of claim 13, wherein the triggering event includes the location of the user.

16. The method of claim 13, wherein the triggering event includes the identity of the user.

17. The method of claim 11, further comprising the server providing statistics on the number of serves, and a controller responsive to the statistics and to an evaluation of the expected number of accesses to the web server, altering the frequency with which the serves of at least some ads are made.

18. A method for providing advertisements over the Internet, the method comprising:

maintaining information about a number of ads including a number of times each ad is to be served over a given time period;

serving ads to users in response to requests for data from users;

monitoring the number of times each ad is served during shorter periods within the time period; and in response to the information obtained from the monitoring step, controlling the serving of ads to prevent at least some of the ads from being served during a certain time period if a greater than desired number of ads is being served during that time period so that the ads can be served in a later time period and the ads are more thereby evenly distributed throughout the time period than they would be served otherwise.

19. A method for providing advertisements over the Internet, the method comprising:

maintaining a list of ads to be served along with other information in response to accesses to a web site by a user;

serving ads to users in response to requests for data from users, the serving including periodically delaying the serving of certain ads to alter the ratio with which the ads are served so that the ads are served in a desired ratio throughout a time period.

* * * * *